United States Patent
Margalit et al.

(10) Patent No.: US 10,977,389 B2
(45) Date of Patent: *Apr. 13, 2021

(54) ANONYMITY ASSESSMENT SYSTEM

(71) Applicant: INTERNATIONAL BUSINESS MACHINES CORPORATION, Armonk, NY (US)

(72) Inventors: Oded Margalit, Ramat Gan (IL); Dennis Potashnik, Omer (IL)

(73) Assignee: International Business Machines Corporation, Armonk, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/394,136

(22) Filed: Apr. 25, 2019

(65) Prior Publication Data

US 2019/0251291 A1 Aug. 15, 2019

Related U.S. Application Data

(63) Continuation of application No. 15/601,273, filed on May 22, 2017.

(51) Int. Cl.
*G06F 21/62* (2013.01)
*G06N 20/00* (2019.01)
(Continued)

(52) U.S. Cl.
CPC ......... *G06F 21/6254* (2013.01); *G06N 20/00* (2019.01); *G06F 16/353* (2019.01);
(Continued)

(58) Field of Classification Search
CPC ................................................ G06F 21/6254
(Continued)

(56) References Cited

U.S. PATENT DOCUMENTS 9,047,488 B2 6/2015 Allen
9,342,836 B2 5/2016 Cronin
(Continued)

FOREIGN PATENT DOCUMENTS

EP 2228735 A2 9/2010

OTHER PUBLICATIONS

S. Fletcher and M. Z. Islam, "Quality Evaluation of an Anonymized Dataset," 2014 22nd International Conference on Pattern Recognition, Stockholm, 2014, pp. 3594-3599, doi: 10.1109/ICPR.2014.618. (Year: 2014).*

(Continued)

*Primary Examiner* — James D. Rutten
(74) *Attorney, Agent, or Firm* — Alexis N. Hatzis (57) ABSTRACT

A method, computer system, and a computer program product for assessing anonymity of a dataset is provided. The present invention may include receiving an original dataset and an anonymized dataset. The present invention may also include preparing a testing dataset and a training dataset for a machine learning algorithm based on the received original dataset and anonymized dataset. The present invention may then include training a machine learning model based on the prepared training dataset. The present invention may further include generating an evaluation score based on the trained machine learning model and the prepared testing dataset. The present invention may also include presenting the generated evaluation score to a user.

1 Claim, 6 Drawing Sheets

(51) Int. Cl.
  *G06K 9/62* (2006.01)
  *G06F 16/35* (2019.01)
  *G06K 9/00* (2006.01)

(52) U.S. Cl.
  CPC ......... *G06K 9/00885* (2013.01); *G06K 9/627* (2013.01); *G06K 9/6256* (2013.01); *G06K 9/6269* (2013.01)

(58) Field of Classification Search
  USPC .......................................................... 706/12
  See application file for complete search history.

(56) References Cited

U.S. PATENT DOCUMENTS

| | | | |
|---|---|---|---|
| 9,348,899 | B2 | 5/2016 | Simard |
| 2004/0172374 | A1 | 9/2004 | Forman |
| 2006/0074824 | A1* | 4/2006 | Li .................. G06F 16/2465 706/20 |
| 2006/0179075 | A1 | 8/2006 | Fay |
| 2011/0307423 | A1 | 12/2011 | Shotton |
| 2012/0158623 | A1 | 6/2012 | Bilenko |
| 2012/0166583 | A1 | 6/2012 | Koonce |
| 2013/0066818 | A1 | 3/2013 | Assadollahi |
| 2013/0133073 | A1 | 5/2013 | El Emam |
| 2014/0123304 | A1 | 5/2014 | Rachlin |
| 2014/0181864 | A1* | 6/2014 | Marshall ................. H04L 65/60 725/38 |
| 2014/0283097 | A1 | 9/2014 | Allen |
| 2014/0351185 | A1 | 11/2014 | Wang |
| 2016/0034703 | A1 | 2/2016 | Dubov |
| 2016/0048766 | A1 | 2/2016 | Mcmahon |
| 2016/0078359 | A1 | 3/2016 | Csurka |
| 2016/0283738 | A1 | 9/2016 | Wang |
| 2017/0048698 | A1 | 2/2017 | Choffnes |
| 2018/0101788 | A1* | 4/2018 | He ........................... G06N 5/04 |
| 2018/0336368 | A1 | 11/2018 | Margalit et al. |
| 2018/0336369 | A1 | 11/2018 | Margalit et al. |

OTHER PUBLICATIONS

Bezzi, "An Information Theoretic Approach for Privacy Metrics," Transactions on Data Privacy, 2010, p. 199-215, vol. 3.

Byun et al., "Efficient k-Anonymization Using Clustering Techniques," DASFAA 2007, 2007, p. 188-200, LNCS 4443, Springer-Verlag Berlin Heidelberg.

Coull et al., "Taming the Devil: Techniques for Evaluating Anonymized Network Data," 16th Annual Network & Distributed System Security Symposium Proceedings (NDSS Symposium), 2008, 11 Pages.

Ghinita et al., "A Framework for Efficient Data Anonymization under Privacy and Accuracy Constraints," ACM Transactions on Database System, Jun. 2009, p. 1-47, Article 9, vol. 34, No. 2.

Gulyás et al., "An Efficient and Robust Social Network De-anonymization Attack," WPES'16, Oct. 24, 2016, p. 1-11, AMC, Vienna, Austria.

Inan et al., "Using Anonymized Data for Classification," IEEE International Conference on Data Engineering, 2009, p. 429-440, IEEE Computer Society.

Kelly et al., "A Survey of State-of-the-Art in Anonymity Metrics," NDA'08, Oct. 31, 2008, p. 31-39, ACM, Fairfax, Virginia, USA.

Mell et al., "The NIST Definition of Cloud Computing," National Institute of Standards and Technology, Sep. 2011, p. 1-3, Special Publication 800-145.

Narayanan et al., "De-anonymizing Social Networks," 2009 30th IEEE Symposium on Security and Privacy, 2009, p. 173-187, IEEE Computer Society.

IBM: List of IBM Patents or Patent Applications Treated as Related (Appendix P), Jun. 3, 2019, pp. 1-2.

Bezzi, "An Information Theoretic Approach for Privacy Metrics," Transaction on Data Privacy, 2010, p. 199-215, vol. 3.

Ghinita et al., "A Framework for Efficient Data Anonymization under Privacy and Accuracy Constraints," ACM Transactions on Database Systems, Jun. 2008, p. 1-47, Article 9, vol. 34, No. 2.

Gulyás at al., "An Efficient and Robust Social Network De-anonymization Attack," WPES'16, Oct. 24, 2015, p. 1-11, ACM, Vienna, Austria.

Inan, et al., "Using Anonymized Data for Classifition," IEEE International Conference on Data Engineering, 2009, p. 429-440, IEEE Computer Society.

Narayanan et al., "De-anonymizing Social Networks," 2008 30th IEEE Symposium on Security and Privacy, 2009, p. 173-187, IEEE Computer Society.

* cited by examiner

ANONYMITY ASSESSMENT SYSTEM

BACKGROUND

The present invention relates generally to the field of computing, and more particularly to assessment of anonymization.

Anonymization is a process of removing personally identifiable information from a dataset in order to maintain the privacy of the individuals to whom the data refers. Removing the personal identification fields, such as name, email, address and social security number may not be sufficient to maintain an acceptable level of privacy, since some individuals may still be identified by cross correlation between different fields, discovered by statistical analysis.

SUMMARY

Embodiments of the present invention disclose a method, computer system, and a computer program product for assessing anonymity of a dataset. The present invention may include receiving an original dataset and an anonymized dataset. The present invention may also include preparing a testing dataset and a training dataset for a machine learning algorithm based on the received original dataset and anonymized dataset. The present invention may then include training a machine learning model based on the prepared training dataset. The present invention may further include generating an evaluation score based on the trained machine learning model and the prepared testing dataset. The present invention may also include presenting the generated evaluation score to a user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for assessment of anonymization. As such, the present embodiment has the capacity to improve the technical field of assessing anonymity by making such assessments automatic and optionally providing hints about a possible de-anonymization process. The system may take as input both an original and anonymized dataset. Thereafter, the system may attempt to automatically de-anonymize the dataset using supervised learning techniques. More specifically, the system may learn each anonymized column of the dataset using the original values as labels for supervised learning techniques. The system can also, optionally, provide a suggestion for further anonymization, depending on the supervised learning algorithm that is used.

As described previously, anonymization is a process of removing personally identifiable information from a dataset (e.g., a columnar oriented database such as a spreadsheet) in order to maintain the privacy of the individuals to whom the data refers. Removing the personal identification fields, such as name, email, address and social security number may not be sufficient to maintain an acceptable level of privacy, since the individuals may still be identified by cross correlation between different fields, discovered by statistical analysis.

Therefore, it may be advantageous to, among other things, provide an automatic tool to assess the anonymity quality of an anonymized dataset given an original dataset.

According to at least one embodiment, the anonymization assessment may be comprised of three modules: the data preparation procedure, the supervised learning algorithm, and the model evaluation. The data preparation procedure may be given as input both the anonymized and the original datasets. Based on the data preparation procedure's input, the system may extract the relevant information and prepare a list of datasets for the supervised learning algorithm. The anonymized datasets may differ from the original dataset by the removal of a column, the partial masking of a value, or the performing of a possibly non-reversible transformation, such as hash or encryption. The columns of the original dataset which are not removed, masked or hidden in the anonymized dataset may be referred to as features.

The present embodiment may also include a supervised learning algorithm module, responsible for training the machine learning models. The machine learning models may be trained on the datasets which are the result of the data preparation procedure. Each dataset may be partitioned into training and testing sets. For each training set, a predefined set of models may be learned in order to predict the possibility of de-anonymization.

Finally, the present embodiment may include a model evaluation module, which may evaluate the models for each dataset by trying to classify the instances of a testing dataset using standard machine learning metrics.

Figure 1:
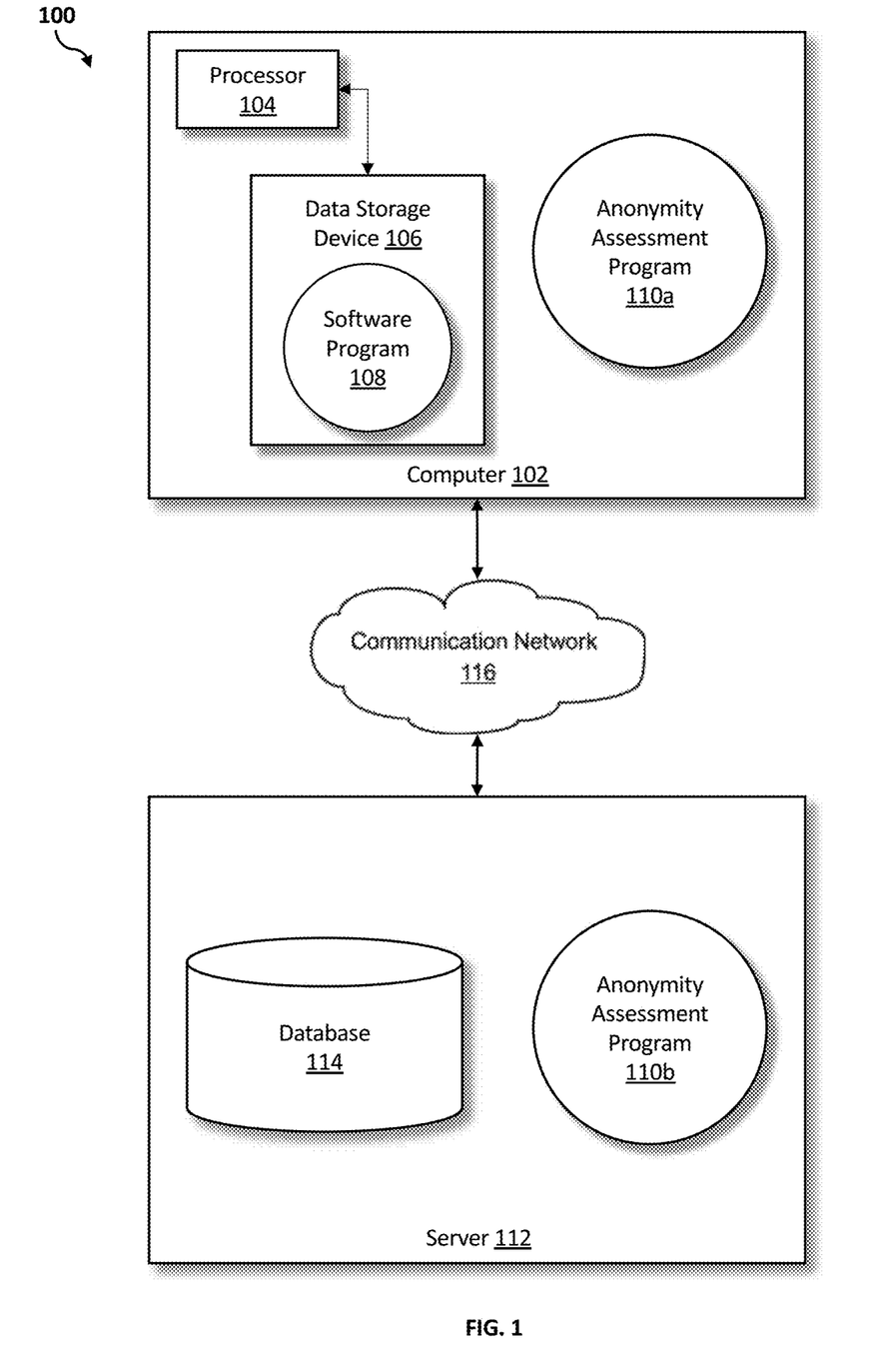
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an anonymity assessment program 110a. The networked computer environment 100 may also include a server 112 that is enabled to run an anonymity assessment program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the anonymity assessment program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the anonymity assessment program 110a, 110b (respectively) to automatically assess anonymization, given both the original and anonymized datasets, by using supervised learning techniques. It may also, optionally, provide a suggestion for further anonymization depending on the supervised learning algorithm that is used by the anonymity assessment system. The anonymity assessment method is explained in more detail below with respect to FIGS. 2 and 3.

Figure 2:
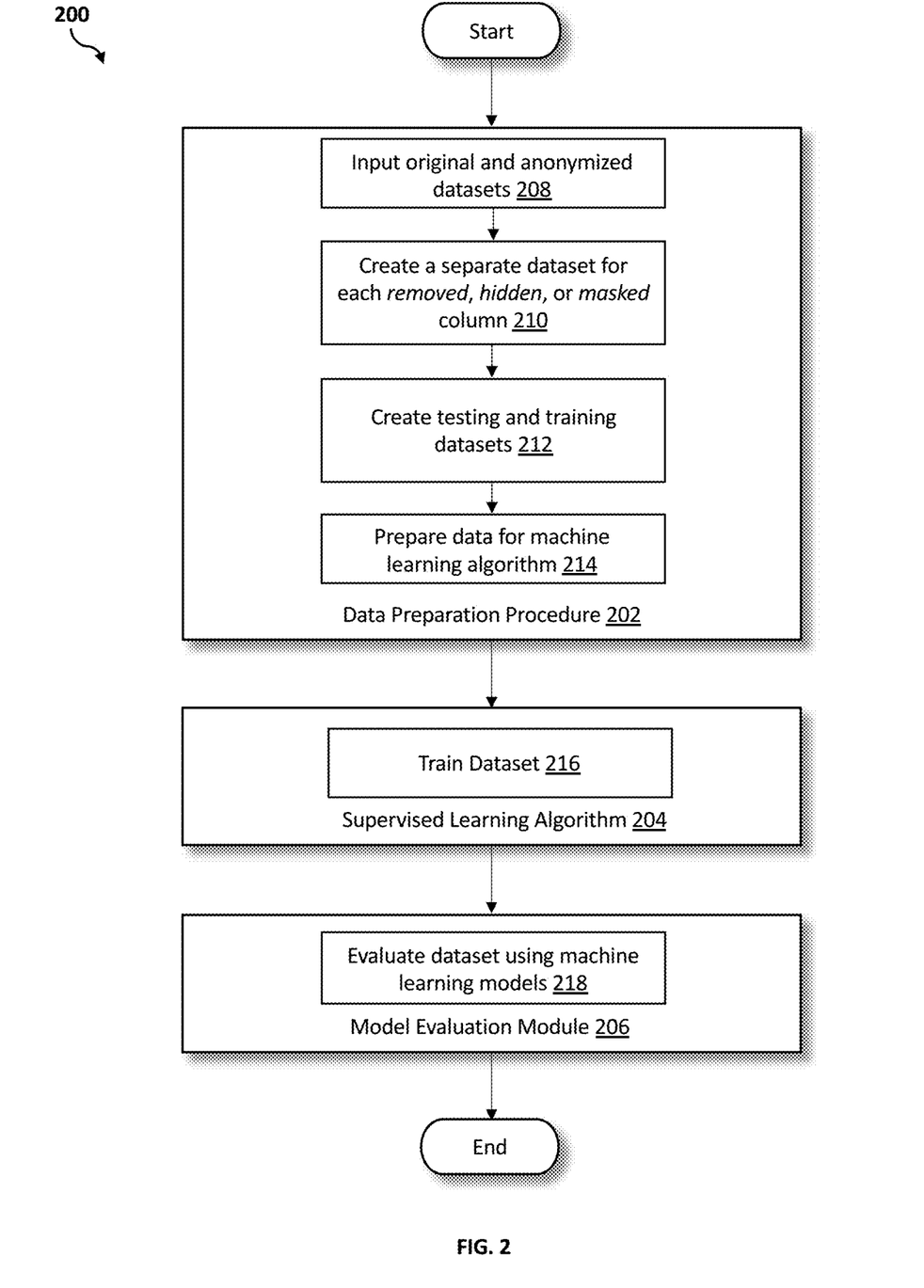
FIG. 2 is an operational flowchart illustrating a process for assessment of anonymization according to at least one embodiment.

Referring now to FIG. 2, an operational flowchart illustrating the exemplary anonymity assessment process 200 used by the anonymity assessment program 110a and 110b according to at least one embodiment is depicted. The anonymity assessment process 200 may include a data preparation procedure 202, a supervised learning algorithm 204, and a model evaluation module 206.

The data preparation procedure 202 may take as input from a user both the anonymized and original datasets at 208. The anonymized and original datasets may be inputted into the program in an xml spreadsheet, a columnar oriented database, or a comma separated string, among other formats. The anonymized dataset may contain a removed column of the original dataset, a partially masked column of the original dataset, or may have undergone a potentially non-reversible transformation, such as hash encryption, thereby resulting in a hidden column of the original dataset.

At 210, the data preparation procedure 202 searches the anonymized dataset column-by-column to determine which columns have been obfuscated or anonymized (e.g., removed, hidden or masked) and creates a separate dataset for each column which was removed, hidden or masked in the original dataset. If the data preparation procedure 202 finds that the column contains no data, then the data preparation procedure 202 may determine that the column was removed. If the data preparation procedure 202 finds that the column contains a special character such as an asterisk, whereby the special character is predefined for use as a mask, then the data preparation procedure 202 may determine the column as masked. If the data preparation procedure 202 does not determine that the column was either removed or masked, then the data preparation procedure 202 may remove the removed and masked columns from both datasets and compare the remaining columns of the anonymized dataset to those of the original dataset to determine that the column was hidden. If the anonymized and original datasets were not inputted into the program in a columnar oriented format, then the string may be searched for the headings removed, hidden or masked. According to at least one other embodiment, the data preparation procedure 202 may search and compare column-by-column the anonymized dataset to the original dataset to determine which columns have been removed, hidden or masked. According to yet another embodiment, the data preparation procedure 202 may provide the user with a graphical user interface (i.e., GUI) in which the user may mark which columns have been removed, hidden or masked.

After determining that the column was removed, hidden or masked, the data preparation procedure 202 may create a separate data structure, for example an xml spreadsheet, a columnar oriented table or a CSV formatted file (i.e., a comma-separated value file), for each dataset. For each removed column, the data preparation procedure 202 may create a dataset that consists of features of the original dataset and the original values of the removed column. The data preparation procedure 202 may mark the removed column as Class. For each hidden column, the data preparation procedure 202 may create a dataset that consists of features of the original dataset and the original values of the hidden column. The data preparation procedure 202 may mark the hidden column as Class. For each masked column, the data preparation procedure 202 may create a dataset that consists of features of the original dataset, the unmasked part of the values of the masked column, and the masked part of the original value of the masked column. The data preparation procedure 202 may mark the masked part of the original values as Class.

Then, at 212, the testing and training datasets are created. In doing so, the number of rows in each Class may be counted for each of the removed, hidden or masked datasets and all rows below a predefined threshold may be removed. This may be done to avoid overfitting of the data, which may occur when the complexity of the machine learning algorithm prevents the algorithm from making good predictions. The predefined threshold, which may be used as a marker to indicate the rows that may be removed, may be preconfigured in the program. The removal of rows below a predefined threshold may be used to partition each of the removed, hidden or masked datasets into training and testing datasets (e.g., by using the known k-fold cross-validation technique or the conventional validation technique). The training and testing datasets may be a subset of the removed, hidden or masked datasets, and may be used together to draw conclusions about the anonymization method, given known features of the datasets. If the conventional validation technique is used to partition the datasets, the training and testing datasets may be of unequal size, for example, 80% of the removed, hidden or masked dataset may be partitioned into the training dataset and 20% of the removed, hidden or masked dataset may be partitioned into the testing dataset, or 70% of the removed, hidden or masked dataset may be partitioned into the training dataset and 30% of the removed, hidden or masked dataset may be partitioned into the testing dataset.

At 214, the data preparation procedure 202 prepares the testing and training datasets for the supervised learning algorithm 204, a category of machine learning algorithms which is used to learn the method for creating desired outputs given both the desired outputs and the inputs. In preparing the data for the supervised learning algorithm 204, the data preparation procedure 202 may standardize diverse data, which may include discretizing continuous values with a predefined method, translating categorical values such as colors into numbers, or normalizing values. The exact preparation of the data may depend on the machine learning algorithm used and whether that algorithm may function with numerical or categorical data. The user may select a machine learning algorithm to use.

Next, at 216, the supervised learning algorithm 204 trains the predefined set of machine learning models on the training dataset. The predefined set of machine learning models may be chosen by the user of the program and may be trained on the training datasets by finding patterns in the data which may be used to shape the models. The trained machine learning models may be used to create predictions on other datasets. For example, the machine learning models may later be run on the testing datasets to correlate the training and testing datasets and determine the quality of the anonymization. Various machine learning algorithms may be used, including white box models, which may be useful in predicting the revealing columns of the dataset (i.e., those anonymized columns which have a high correlation to non-anonymized columns, and based on which the classifier may be able to de-anonymize the anonymized columns).

At 218 of the model evaluation module 206, each dataset will be evaluated using machine learning models. If white box models were used previously at 216, the user may be presented with more comprehensive information about the de-anonymization of the datasets, including what may have caused the prediction and what the correlation may be between portions of data in the given dataset. The model evaluation module 206 may also produce an evaluation score which correlates to the quality of the anonymization and may optionally provide a suggestion for further anonymization depending on which supervised learning algorithm 204 is used. For example, some supervised learning algorithms may indicate how the score is determined, or what part of the data correlates to other parts of the data in the same dataset. The machine learning models may try to classify the testing dataset using standard statistical metrics, for example, by calculating the receiver operating characteristic curve, which is used to plot the performance of a classifier system, and by measuring the area under the curve.

Figure 3:
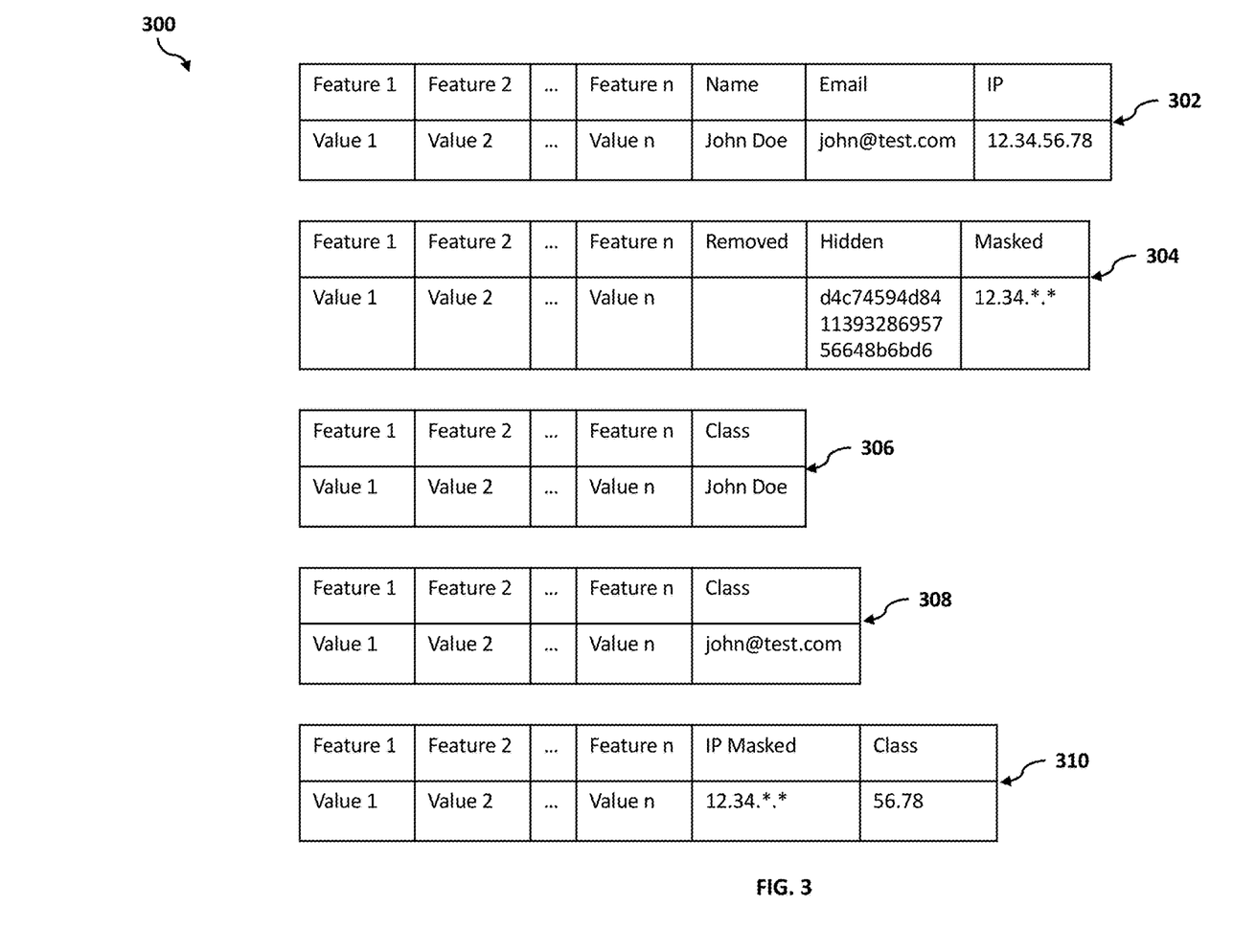
FIG. 3 is an exemplary illustration of the dataset processing according to at least one embodiment.

Referring now to FIG. 3, an exemplary illustration of the dataset processing 300 used by the anonymity assessment program 110a and 110b according to at least one embodiment is depicted. As discussed previously at 208, an original dataset 302 may be inputted into the data preparation procedure 202 with the anonymized dataset 304. Based on the input, the data preparation procedure 202 may extract the relevant information and prepare a list of datasets for the supervised learning algorithm 204.

As illustrated in the dataset processing 300, the data preparation procedure 202 takes as input an original dataset 302 and an anonymized dataset 304, as discussed previously at 208. The original dataset 302 contains sensitive information in the last three columns, therefore, those columns may be marked removed, hidden, and masked in the anonymized dataset 304.

As discussed previously at 210, the data preparation procedure 202 will create a separate dataset for each column in the original dataset 302 which was removed, masked, or hidden. For the removed column in the anonymized dataset 304, the data preparation procedure 202 may create a removed column dataset 306 that consists of features and the original values of the removed column. As shown, the original value of the removed column (i.e., John Doe) is provided and the column is marked Class in the removed dataset 306.

Likewise, for the hidden column in the anonymized dataset 304, the data preparation procedure 202 will create a hidden column dataset 308 that consists of features and the original values of the hidden column. The hidden column may then be marked Class. As shown, the original value of the hidden column (i.e., john@test.com) is provided and the column is marked Class in the hidden dataset 308.

Lastly, for the masked column in the anonymized dataset 304, the data preparation procedure 202 will create a masked column dataset 310 that consists of features, the unmasked part of the values of the masked column and the masked part of the original value of the masked column. The masked part of the original value may then be marked Class in the masked dataset 310. As shown, the dataset contains features of the original dataset 302, the unmasked part of the values contained in the masked column (i.e., 12.34.*.*) and the part of the original dataset which was masked in the anonymized dataset 304 (i.e., 56.78). Thereafter, the data preparation procedure 202 may use the removed column dataset 306, the hidden column dataset 308, and the masked column dataset 310 to create the training and testing datasets as described previously at 212.

It may be appreciated that FIGS. 2 and 3 provide only an illustration of one embodiment and do not imply any limitations with regard to how different embodiments may be implemented. Many modifications to the depicted embodiment may be made based on design and implementation requirements.

Figure 4:
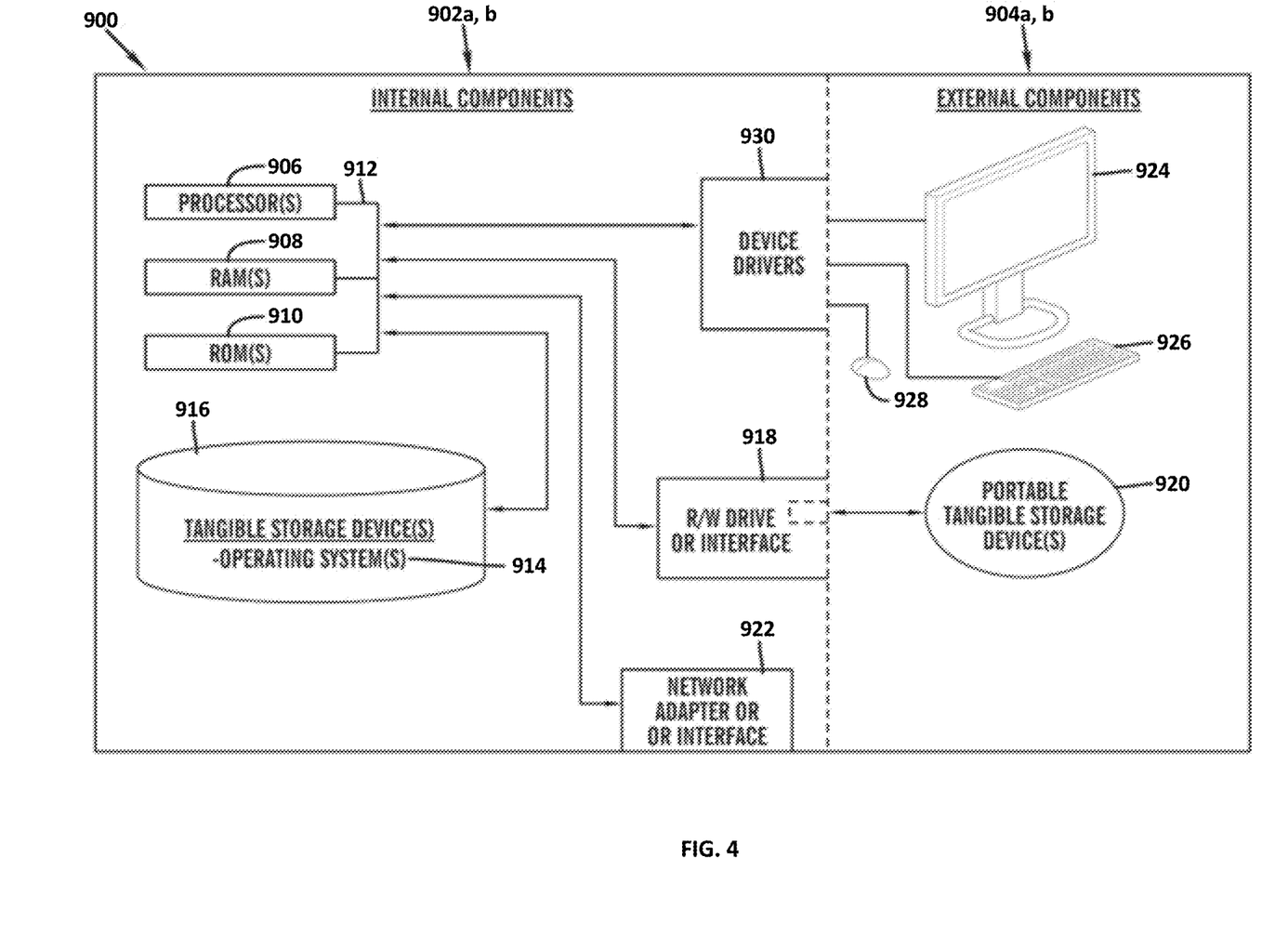
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the anonymity assessment program 110a in client computer 102, and the anonymity assessment program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the anonymity assessment program 110a and 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the anonymity assessment program 110a in client computer 102 and the anonymity assessment program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the anonymity assessment program 110a in client computer 102 and the anonymity assessment program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
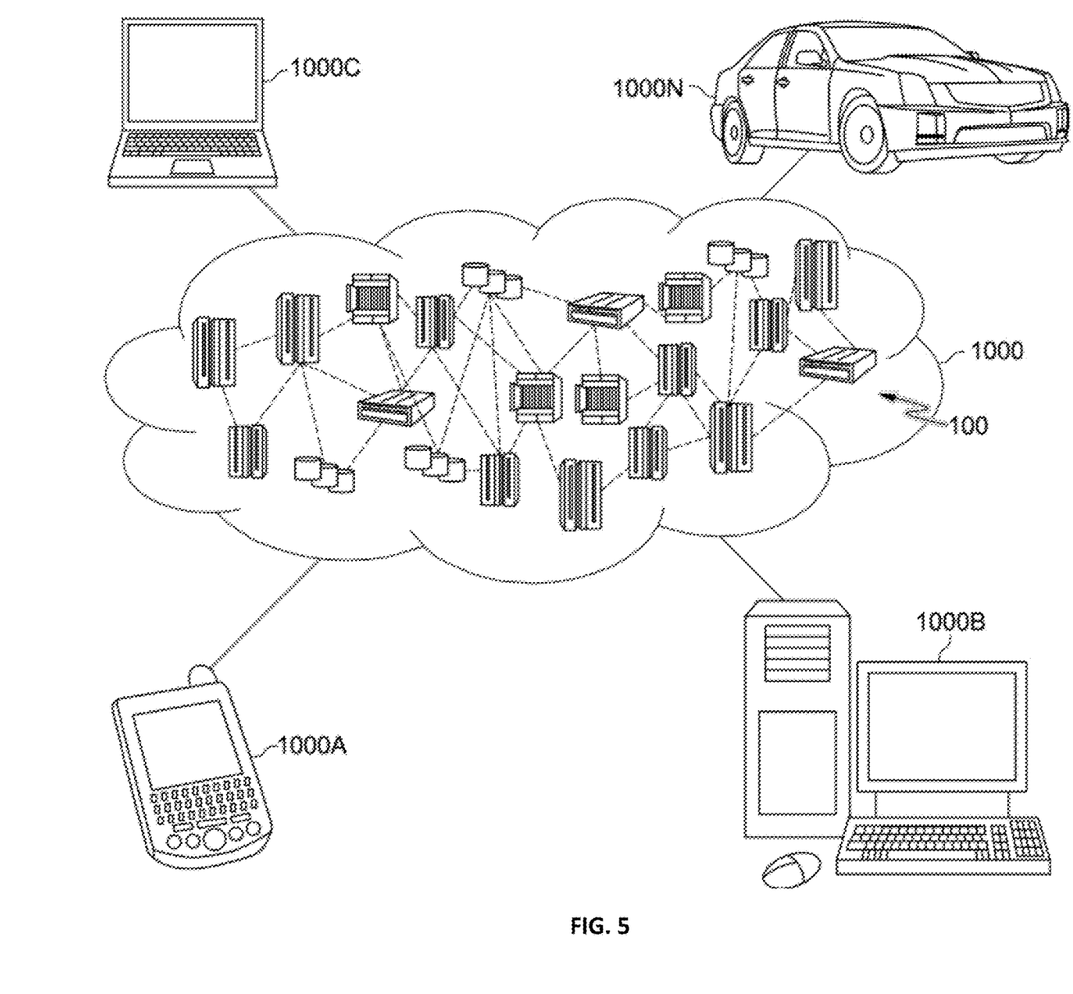
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
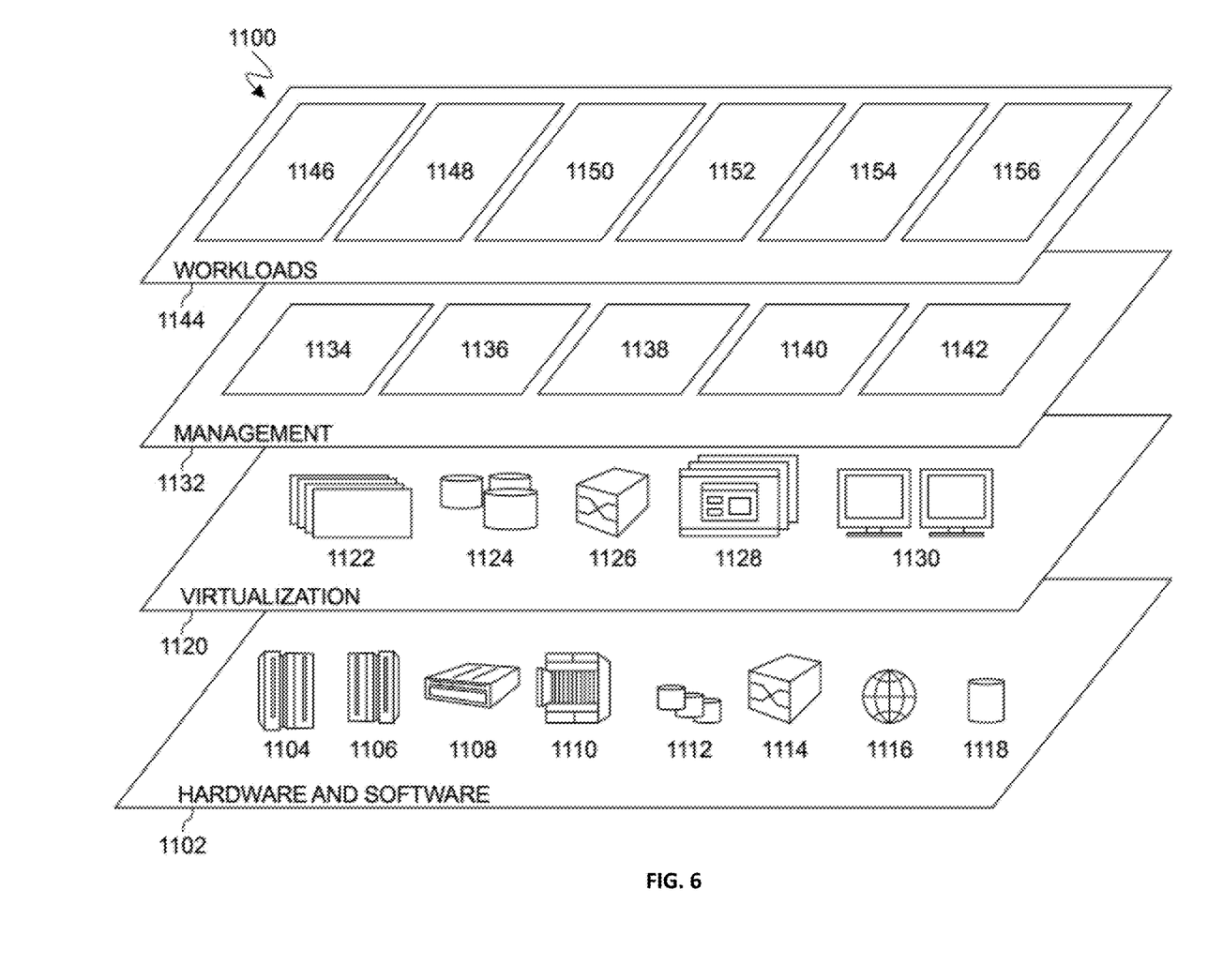
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 include hardware and software components. Examples of hardware components include: mainframes 1104; RISC (Reduced Instruction Set Computer) architecture-based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and anonymity assessment 1156. An anonymity assessment program 110a, 110b provides a way to automatically assess anonymization, given both the original and anonymized datasets, by using supervised learning techniques. It can also, optionally, provide a suggestion for further anonymization.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for assessing anonymity of a dataset, the method comprising:

receiving an original dataset and an anonymized dataset, wherein the original dataset is inputted as a comma separated string, the anonymized dataset is inputted as a comma separated string, and the anonymized dataset is encrypted using hash encryption;

searching the inputted anonymized dataset for a masked heading, wherein the masked heading is followed by a plurality of masked data;

creating a new dataset with a plurality of data from the original dataset and a plurality of data from the anonymized dataset, wherein the plurality of data from the anonymized dataset is masked data;

creating a testing dataset and a training dataset for a machine learning algorithm based on the received original dataset and anonymized dataset, wherein the testing dataset and training dataset are created using a k-fold cross-validation technique;

preparing the testing dataset and the training dataset by discretizing a plurality of continuous data with a pre-defined method, translating a plurality of categorical data into a number, and normalizing a plurality of data;

training a machine learning model based on the prepared training dataset, wherein the machine learning model is a white box model;

generating an evaluation score based on the trained machine learning model and the prepared dataset, wherein a suggestion for further anonymization is made based on the generated evaluation score; and presenting the generated evaluation score to a user.

* * * * *